United States Patent Office 3,557,155
Patented Jan. 19, 1971

3,557,155
NOVEL ANTHRAQUINONE DISPERSE
DYESTUFFS
Eiji Yamada, Takatsuki-shi, Hiroshi Korenaga, Nishinomiya-shi, and Takashi Akamatsu, Ashiya-shi, Japan, assignors to Sumitomo Chemical Company, Ltd., Higashiku, Osaka, Japan, a corporation of Japan
No Drawing. Filed Sept. 7, 1966, Ser. No. 577,610
Claims priority, application Japan, Dec. 1, 1965, 40/74,120, 40/74,121; Mar. 3, 1966, 41/13,283, 41/13,284
Int. Cl. C09b 1/12, 1/50
U.S. Cl. 260—373        7 Claims

ABSTRACT OF THE DISCLOSURE

Anthraquinone dispersed dyestuffs having good fastness and dyeability without deterioration of dyeability, particularly on synthetic fibers represented by the formula

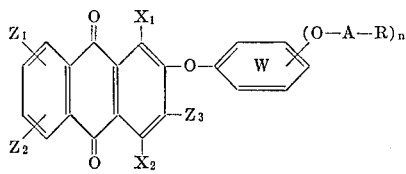

wherein A means a bridging radical represented by a formula of —$SO_2$—, or —CO—, R means an alkyl radical or alkenyl radical having 1 to 6 carbon atoms; an alkoxyalkyl radical having 3 to 6 carbon atoms; a haloalkyl radical or a haloalkenyl radical having 1 to 3 carbon atoms; an aralkyl radical having 7 to 10 carbon atoms; a cycloalkyl radical having 5 to 7 carbon atoms; phenyl radical substituted with or not substituted with an alkyl radical, an alkoxy radical or alkylmercapto radical having 1 to 6 carbon atoms, a hydroxy radical or a halogen atom, $X_1$ and $X_2$ mean respectively amino radical or hydroxy radical, $Z_1$, $Z_2$ and $Z_3$ mean respectively hydrogen atom or a halogen atom, $n$ means a whole number of 1 or 2, and benzene nucleus W may be further substituted with a lower alkyl radical, a lower alkoxy radical or a halogen atom.

This invention relates to novel anthraquinone disperse dyestuffs, method for the production of the same and method for dyeing synthesized shaped articles with the same with fastnesses. It relates also to various synthesized shaped articles which are dyed with the present anthraquinone disperse dyestuffs.

More specifically, this invention relates to novel anthraquinone disperse dyestuffs represented by the following formula

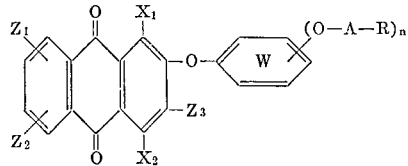

(I)

wherein A means a bridging radical represented by a formula of —$SO_2$— or —CO—, R means an aliphatic or an aromatic residue which is free from a water-solubilizing radical, $X_1$ and $X_2$ mean respectively amino radical or hydroxy radical, $Z_1$, $Z_2$ and $Z_3$ mean respectively hydrogen atom or a halogen atom, $n$ means a whole number of 1 or 2 and benzene nucleus W may be further substituted with a lower alkyl radical, a lower alkoxy radical or a halogen atom.

It relates also to method for the production of the same and method for dyeing synthesized shaped articles, especially fibers of aromatic polyester and acetyl cellulose, with the same with fastnesses.

As is well known, this kind of disperse dyestuffs difficultly possesses satisfactory fastnesses and dyeabilities consistently. This is to say, improvement in fastnesses, especially fastness to sublimation is usually accompanied by deterioration of the level-dyeing and build-up properties, because such fastness could be improved with variation of physical properties of dyestuffs and decrease of affinity to fiber articles.

The anthraquinone disperse dyestuffs introduced into the β-position thereof with a phenoxy radical are known with defects of inferior fastnesses, especially fastness to sublimation. Moreover, the dyestuffs introduced into the β-position thereof with a phenoxy radical which is further substituted with an alkyl radical, an alkoxy radical, an alkylmercapto radical, or alkoxycarbonyl radical, an alkylaminosulfonyl radical or a halogen atom, are also known, but they are not always satisfactory for the accomplishment of all of the requirements on dyestuffs at the same time, such as level-dyeing and build-up properties and fastness to sublimation.

While the present inventors have studied the radical to be further-substituted to the phenoxy radical which is introduced into the β-position of the anthraquinone nucleus, in order to improve fastnesses, especially fastness to sublimation without deterioration of dyeability.

Hereon, surprising is the finding that, by introducing the radical represented by the following formula into the said phenoxy radical

—O—A—R wherein A and R have the same meanings as defined above, novel, useful anthraquinone disperse dyestuffs are obtained with satisfaction in both fastnesses, especially fastness to sublimation, and dyeability on synthesized shaped articles.

Thus, one object of the present invention is to provide novel anthraquinone disperse dyestuffs which are more useful for dyeing synthesized shaped articles, especially fibers, as compared with the known anthraquinone disperse dyestuffs. Another object of the present invention is to provide method for the production of such disperse dyestuffs.

Still another object of the present invention is to provide method for dyeing synthesized shaped articles, such as fiber, ribbon, film, sheet and the like, with the abovementioned dyestuffs. Other objects of the present invention will be apparent from the following description.

The present inventors have found that these and other objects of the present invention can be accomplished by provision of novel anthraquinone disperse dyestuffs represented by the following formula,

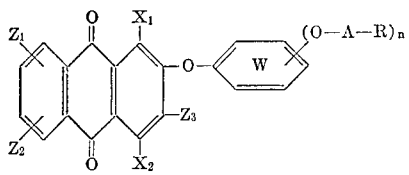

(I)

wherein A means a bridging radical represented by a formula of —SO$_2$— or —CO—, R means an aliphatic or an aromatic residue which is free from a water-solubilizing radical, preferably, an alkyl radical or alkenyl radical having 1 to 6 carbon atoms; an alkoxy-alkyl radical having 3 to 6 carbon atoms; a haloalkyl radical or a haloalkenyl radical having 1 to 3 carbon atoms; an aralkyl radical having 7 to 10 carbon atoms; a cycloalkyl radical having 5 to 7 carbon atoms; phenyl radical substituted or not substituted with an alkyl radical, an alkoxy radical or alkylmercapto radical having 1 to 6 carbon atoms, a hydroxy radical or a halogen atom; $X_1$ and $X_2$ mean respectively amino radical or hydroxy radical, $Z_1$, $Z_2$ and $Z_3$ mean respectively hydrogen atom or a halogen, $n$ means a whole number of 1 or 2 and benzene nucleus W may be further substituted with a lower alkyl radical, a lower alkoxy radical or a halogen atom. In the present invention, method for production of the same is also provided, which comprises contacting a β-phenoxy-anthraquinone represented by the following formula,

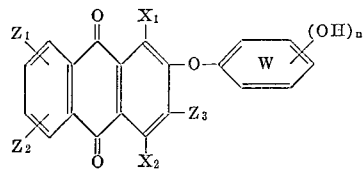

(II)

wherein $n$, W, $X_1$, $X_2$, $Z_1$, $Z_2$ and $Z_3$ have the same meanings as defined above, with an acylating agent chosen from an anhydride or a halide of a carboxylic acid represented by the following formula,

R—COOH          (III)

wherein R has the same meanings as defined above, and a sulfonyl halide represented by the following formula,

R—SO$_2$—X          (IV)

wherein X means a halogen atom and R has the same meanings as defined above, the said acylating agent being employed in at least an equimolar amount against the said β-phenoxyanthraquinone and the reaction being controlled in the presence of an acid binding agent, if necessary, in an organic solvent; or contacting a β-halogenoanthraquinone represented by the following formula,

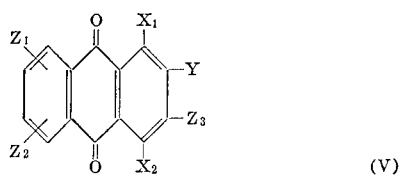

(V)

wherein Y means a halogen atom, and $X_1$, $X_2$, $Z_1$, $Z_2$ and $Z_3$ have the same meanings as defined above, with a substituted phenol represented by the following formula,

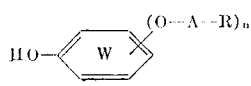

(VI)

wherein A, $n$, R and W have the same meanings as defined above, the said substituted phenol being employed in at least an equimolar amount against the said β-halogenoanthraquinone and the reaction being controlled in the presence of an acid binding agent, if necessary, in an organic solvent. Furthermore, method for dyeing synthesized shaped articles, especially, aromatic polyester fiber articles and acetyl cellulose fiber articles, is provided which is characterized by contacting the synthesized shaped articles with at least one of the present novel anthraquinone disperse dyestuffs represented by the Formula I.

A full understanding on the present invention can be given by referring to the following detailed illustration.

As a β-phenoxyanthraquinone represented by the Formula II, almost all of which are already known, 1-amino-2-(4' - hydroxyphenoxy) - 4 - hydroxyanthraquinone,
1-amino-2-(3' - hydroxyphenoxy) - 4 - hydroxyanthraquinone,
1-amino-2-(2' - hydroxyphenoxy) - 4 - hydroxyanthraquinone,
1-amino-2 - (dihydroxyphenoxy) - 4 - hydroxyanthraquinone,
1,4-diamino-2-(4' - hydroxyphenoxy) - 3 - chloroanthraquinone,
1,4-diamino-2-(3' - hydroxyphenoxy) - 3 - chloroanthraquinone,
1,4-dihydroxy-2-(4'-hydroxyphenoxy)anthraquinone,
1,4-dihydroxy-2-(3'-hydroxyphenoxy)anthraquinone,
1,4-dihydroxy - 2 - (4'-hydroxyphenoxy) - 5,8 - dichloroanthraquinone,
1-amino-2-(3'-hydroxyphenoxy) - 4 - hydroxy-8-chloroanthraquinone,
1-amino-2-(4'-hydroxyphenoxy) - 4 - hydroxy-8-bromoanthraquinone,
1-amino-2-(3' - hydroxyphenoxy) - 4 - hydroxy-5-bromoanthraquinone,
1-amino-2-(4'-hydroxyphenoxy) - 4 - hydroxy-5-chloroanthraquinone,
1-amino-2-(4'-hydroxyphenoxy) - 4 - hydroxy-6-chloroanthraquinone,
1-amino-2-(3' - hydroxyphenoxy)-4-hydroxy-6,7-dichloroanthraquinone and the like, are exemplified, but they are, of course, not to limit the scope of the present invention.

As an active β-halogenoanthraquinone represented by the formula of (V), 1-amino-2-bromo-4-hydroxyanthraquinone,
1,4-diamino-2-bromoanthraquinone,
1,4-dihydroxy-2-bromoanthraquinone,
1,4-diamino-2,3-dichloroanthraquinone,
1-amino-4-hydroxy-2,8-dichloroanthraquinone,
1-amino-4-hydroxy-2,5-dibromoanthraquinone,
1,4-dihydroxy-2,5,8-trichloroanthraquinone,
1-amino-2-bromo-4-hydroxy-5,8-dichloroanthraquinone,
1,4-dihydroxy-2-bromo-6,7-dichloroanthraquinone,
1-amino-4-hydroxy-2,6,7-trichloroanthraquinone,
1,4-diamino-2-bromo-6,7-dichloroanthraquinone and the like, are exemplified. Carboxylic acids represented by the formula of (III) are as follows: acetic acid, monochloroacetic acid, propionic acid, butyric acid, glycolic acid, acrylic acid, methoxyacetic acid, ethoxyacetic acid, hydroxypropionic acid, n-butoxyacetic acid, phenoxyacetic acid, crotonic acid, cinnamic acid, β-phenylpropionic acid, phenylacetic acid, 3,4-dimethylphenylacetic acid, n-amyloxyacetic acid, anisic acid, benzoic acid, methylbenzoic acid, ethylbenzoic acid, propylbenzoic acid, ethoxybenzoic acid, chlorobenzoic acid, hydroxybenzoic acid, cyclohexylcarboxylic acid and the like. In practice of the present invention, the said carboxylic acids can be, in fact, employed in the form of an acid anhydride, chloride or bromide thereof.

Sulfonyl halides (IV) employed in the present invention are as follows, which are, of course, not to limit the scope of the present invention:

methanesulfonyl chloride,
methanesulfonyl bromide,
ethanesulfonyl chloride,
n-propanesulfonyl chloride,
n-butanesulfonyl chloride,
iso-pentanesulfonyl chloride,
allylsulfonyl chloride,
vinylsulfonyl chloride,
β-metallylsulfonyl chloride,
β-methoxyethanesulfonyl chloride,
β-ethoxyethanesulfonyl chloride,
β-butoxyethanesulfonyl chloride,
chloromethylsulfonyl chloride,
bromomethylsulfonyl chloride,
α-chlorovinylsulfonyl chloride,
γ-chloroallylsulfonyl chloride,
cyclohexanesulfonyl chloride,
benzylsulfonyl chloride,
benzenesulfonyl chloride,
benzenesulfonyl bromide,
p-methylbenzenesulfonyl chloride,
p-methylbenzenesulfonyl bromide,
p-ethylbenzenesulfonyl chloride,
p-iso-propylbenzenesulfonyl chloride,
o-methylbenzenesulfonyl chloride,
o-methylbenzenesulfonyl bromide,
2,4-dimethylbenzenesulfonyl chloride,
p-methoxybenzenesulfonyl chloride,
p-ethoxybenzenesulfonyl chloride,
p-n-propoxybenzenesulfonyl chloride,
p-n-butoxybenzenesulfonyl chloride,
4-methyl-3-methoxybenzenesulfonyl chloride,
4-methylmercaptobenzenesulfonyl chloride,
m-chlorobenzenesulfonyl chloride,
p-chlorobenzenesulfonyl chloride,
3-nitrobenzenesulfonyl chloride,
3-nitro-4-methoxybenzenesulfonyl chloride,
2,4-dichlorobenzenesulfonyl chloride,
p-bromobenzenesulfonyl chloride,
m-hydroxybenzenesulfonyl chloride.

The substituted phenol (VI) may be easily obtained by acylating a polyhydroxybenzene, such as resorcin, hydroquinone, pyrocatechin, pyrogallol, 2-methylresorcin, 4-bromoresorcin, methylhydroquinone, chlorohydroquinone, and pyrogallol monomethyl ether, with the anhydride or halide of the carboxylic acid (III) or the sulfonyl halide (IV) as mentioned above according to the conventional acylation method.

As the thus obtained substituted phenol, there are exemplified 3-(methylsulfonyloxy)phenol,
4-(ethylsulfonyloxy)phenol,
2-(vinylsulfonyloxy)phenol,
3-(ethoxyethylsulfonyloxy)phenol,
4-(cyclohexylsulfonyloxy)phenol,
2-(benzenesulfonyloxy)phenol,
3-(benzenesulfonyloxy)phenol,
4-(benzenesulfonyloxy)phenol,
2-(4'-methylbenzenesulfonyloxy)phenol,
3-(4'-methylbenzenesulfonyloxy)phenol,
4-(4'-methylbenzenesulfonyloxy)phenol,
4-(2'-methylbenzenesulfonyloxy)phenol,
4-(4'-propylbenzenesulfonyloxy)phenol,
3-(4'-methoxybenzenesulfonyloxy)phenol,
2-(4'-ethoxybenzenesulfonyloxy)phenol,
4-(4'-propoxybenzenesulfonyloxy)phenol,
3-(2',4'-dimethylbenzenesulfonyloxy)phenol,
4-(4'-chlorobenzenesulfonyloxy)phenol,
3-(4'-fluorobenzenesulfonyloxy)phenol,
3-(3'-bromobenzenesulfonyloxy)phenol,
4-(2',4'-dichlorobenzenesulfonyloxy)phenol;
3-(methylcarbonyloxy)phenol,
4-(ethylcarbonyloxy)phenol,
2-(vinylcarbonyloxy)phenol,
4-(cyclohexylcarbonyloxy)phenol,
2-(benzenecarbonyloxy)phenol,
3-(benzenecarbonyloxy)phenol,
4-(benzenecarbonyloxy)phenol,
2-(4'-methylbenzenecarbonyloxy)phenol,
3-(4'-methylbenzenecarbonyloxy)phenol,
4-(4'-methylbenzenecarbonyloxy)phenol,
4-(2'-methylbenzenecarbonyloxy)phenol,
4-(4'-propylbenzenecarbonyloxy)phenol,
3-(4'-methoxybenzenecarbonyloxy)phenol,
2-(4'-ethoxybenzenecarbonyloxy)phenol,
4-(4'-chlorobenzenecarbonyloxy)phenol
and the like.

As is proven in the preceding detailed illustration, R in the foregoing formulae means an aliphatic or an aromatic residue which is free from water-solubilizing radical, namely free from such radicals as sulfo, sulfino and carboxyl radical.

For method for the production of the objective dyestuffs (I), the β-phenoxyanthraquinone (II) is subjected to acylation reaction with an acid anhydride or a halide of the carboxylic acid (III), or a sulfonyl halide (IV); or the β-halogenoanthraquinone (V) is subjected to condensation reaction with a substituted phenol (VI), thereby to obtain the objective dyestuffs (I).

More concretely speaking, the β-phenoxyanthraquinone (II) is mixed with at least an equimolar amount of the acylating agent, namely the anhydride or the halide of the carboxylic acid (III) or the sulfonyl halide (IV), by use of an acid binding agent such as sodium carbonate, tertially amines, i.e. pyridine, picoline, triethylamine or dimethylaniline and the like, if necessary, in the presence of a solvent, such as weak basic solvents, i.e. pyridine, picoline or dimethylaniline; alcohols i.e. methyl alcohol, ethyl alcohol, butyl alcohol, ethyleneglycol monomethyl ether, ethyleneglycol or diethyleneglycol; ketones i.e. acetone, methyl ethyl ketone or methyl isobutyl ketone; aromatic solvents i.e. toluene, nitrobenzene or chlorobenzene; neutral solvents i.e. dimethylformamide or dimethyl sulfoxide; and a mixture of the said basic solvents with the said neutral solvents. The reaction temperature may not be restricted, but usually, the reaction may be preferably controlled at a temperature of 0° to 100° C.

If the solid reaction product is produced in the reaction mixture, the mixture may be, as it is, subjected to filtration without other treatments, thereby to separate the crystals. In the case where the solid reaction product is not produced in the reaction mixture, the mixture may be poured or added with water or other solvent such as alcohols and the like, to which the resulting product is hardly soluble, thereby to precipitate crystals, which are, thereafter, separated off by filtration.

The separated product is successively washed and dried.

While, the β-halogenoanthraquinone (V) is mixed with at least an equimolar amount of the substituted phenol (VI), in the presence of an acid binding agent such as sodium or potassium carbonate and alkali hydroxide, if necessary, using neutral solvents, preferably hydrophilic solvents having high boiling point, such as dimethylformamide and dimethyl sulfoxide. The temperature in this reaction may not be restricted, but, the reaction may be preferably controlled at a temperature of 100° to 160° C.

The present novel anthraquinone disperse dyestuffs are applicable for dyeing various synthesized shaped articles, such as fiber, ribbon, film, sheet and the like, preferably hydrophobic fiber articles, especially aromatic polyester fiber articles.

More concretely speaking, at least one of the present dyestuffs, a dispersing agent and water are admixed and ground in a ball mill for a sufficient period of time, and the resulting colloidal mixture is subjected to spray drying, thereby to obtain a dyeing agent. Material to be dyed may be treated in a dye bath containing the dyeing agent obtained above at a temperature of 110° to 130° C. under pressure for 60 to 90 minutes. The thus treated material is rinsed with water, reductively rinsed and thereafter dried, thereby to obtain a dyed product in clear shade with high fastnesses to light, washing and sublimation.

Hereon, it is worthy of special mention that the thus obtained dyed product has exceedingly high fastness to sublimation.

While, material to be dyed may be treated with the said dyeing agent according to the carrier dyeing or the thermosol dyeing method, or may be printed with a paste containing the said dyeing agent.

Thus, a dyed product in clear shade may be also obtained having high fastnesses to light, washing and sublimation.

The present invention will be illustrated more concretely with reference to the following examples, which are given by way of illustration and not by way of limitation of the present invention.

All parts and percentages are by weight.

EXAMPLE 1

A mixture of 4 parts of 1-amino-2-bromo-4-hydroxyanthraquinone, 26.7 parts of 3-(4'-methylbenzenesulfonyloxy)phenol, 1.1 parts of potassium carbonate and 10 parts of dimethyl sulfoxide is stirred for 14 hours at a temperature of 115° to 125° C.

After the completion of the reaction is confirmed by disappearance of the employed 1-amino-2-bromo-4-hydroxyanthraquinone by means of chromatography, the reaction mixture is cooled to room temperature, added with 20 parts of methyl alcohol and successively stirred overnight, thereby to produce crystals, which are separated by filtration, washed with methyl alcohol, successively with water, and dried.

Thus, a novel anthraquinone disperse dyestuff having the following formula,

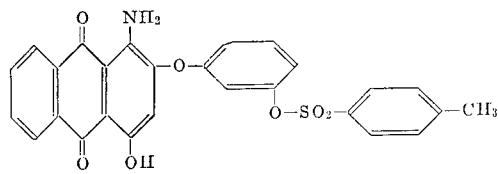

is obtained.

*Elementary analysis.*—Calculated (as $C_{27}H_{19}NO_7S$) (percent): C, 64.6; H, 3.82; N, 2.79; S, 6.38. Found (percent): C, 64.0; H, 3.84; N, 2.31; S, 6.07.

The thus-obtained dyestuff may be employed for dyeing aromatic polyester fiber articles in bluish red shade with exceedingly high fastnesses to light and sublimation.

EXAMPLE 2

A mixture of 2 parts of 1-amino-2-(3'-hydroxyphenoxy)-4-hydroxyanthraquinone and 12 parts of pyridine is gradually added with 3.6 parts of p-methylbenzenesulfonyl chloride at temperature of 5° C. while being stirred and the reaction mixture is stirred overnight at the same level of temperature. Crystals are produced with disappearance of the raw material. Thus, the same dyestuff as in Example 1 is obtained.

EXAMPLE 3

A mixture of 2 parts of 1-amino-2-bromo-4-hydroxyanthraquinone, 12.6 parts of 3-(benzenesulfonyloxy) phenol, 0.55 part of potassium carbonate and 5 parts of dimethyl sulfoxide is stirred for 11 hours at a temperature of 110° to 120° C.

After the reaction is over, the reaction mixture is added with 15 parts of methyl alcohol and stirred overnight, thereby to produce crystals, which are separated by filtration, washed with methyl alcohol, then with water and dried.

The thus-obtained novel dyestuff having the following formula,

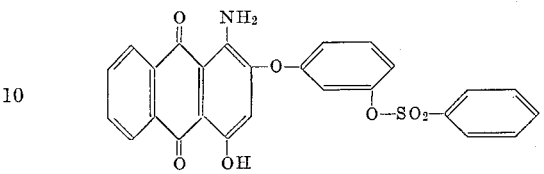

M.P. 125° to 128° C. (crude crystals)

which may be purified by recrystallization from an organic solvent such as acetone, may be employed for dyeing aromatic polyester fiber articles in bluish red shade with high fastnesses to light and sublimation.

EXAMPLE 4

A mixture of 7 parts of 1-amino-2-(3'-hydroxyphenoxy)-4-hydroxyanthraquinone, 35 parts of acetone, 4 parts of benzenesulfonyl chloride and 5 parts of anhydrous sodium carbonate is stirred for 20 hours at temperature of 25° C. Crystals are produced with disappearance of the raw material. Thus, the same deystuff as in Example 3 is obtained.

EXAMPLE 5

A mixture of 3 parts of 1-amino-2-bromo-4-hydroxyanthraquinone, 15 parts of 4-(benzensulfonyloxy)phenol, 0.8 part of potassium carbonate and 7.5 parts of dimethyl sulfoxide is stirred for 2 hours at a temperature of 115° to 125° C.

After the reaction is over, the reaction mixture is cooled and added with 20 parts of methyl alcohol, thereby to produce crystals, which are treated according to the same way as in Example 1.

The thus-obtained novel dyestuff having, as a principal component the following formula,

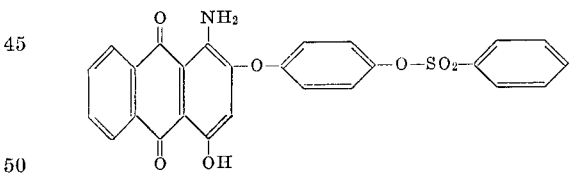

M.P. 213° to 216° C. (crude crystals)

may be employed for dyeing polyester fiber articles in bluish red shade with high fastness to light and sublimation.

EXAMPLE 6

Instead of 1-amino-2-(3'-hydroxyphenoxy)-4-hydroxyanthraquinone in Example 2, 1-amino-2-(4'-hydroxypheenoxy)-4-hydroxyanthraquinone is treated according to the same way as in Example 2, thereby to obtain a novel dyestuff having the following formula,

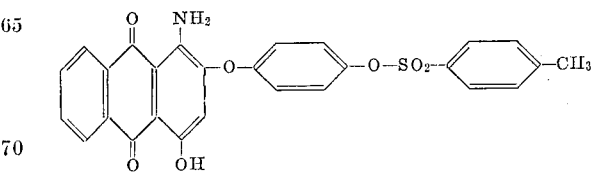

M.P. 185° to 192° C. (crude crystals)

which may be employed for the purposes similar to that in Example 5.

EXAMPLE 7

A mixture of 7 parts of 1-amino-2-(4'-hydroxyphenoxy)-4-hydroxyanthraquinone, 70 parts of ethyleneglycol monomethyl ether and 2.2 parts of sodium carbonate is gradually added with 4.5 parts of o-toluenesulfonyl chloride at temperature of 5° C. while being stirred and the reaction mixture is further stirred for 20 hours at a temperature of 5° to 15° C. thereby to obtain a novel dyestuff having the following formula.

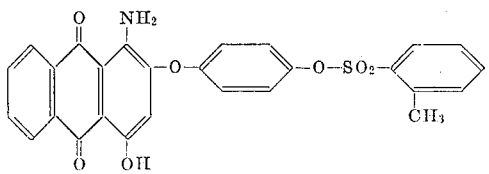

which may be employed for dyeing aromatic polyester fiber articles in red shade with high fastnesses to light and sublimation.

EXAMPLE 8

A mixture of 7 parts of 1-amino-2-(2'-hydroxyphenoxy)-4-hydroxyanthraquinone, 70 parts of ethyleneglycol monomethyl ether and 2.2 parts of sodium carbonate is gradually added with 4.6 parts of p-toluenesulfonyl chloride while being stirred and the reaction mixture is further stirred for 20 hours at a temperature of 5° to 15° C. thereby to obtain 8.8 parts of a novel dyestuff having the following formula,

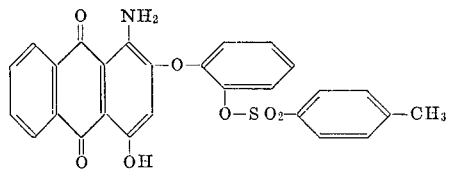

which may be employed for dyeing aromatic polyester fiber articles in red shade with high fastnesses to light and sublimation.

EXAMPLE 9

A mixture of 7 parts of 1-amino-2-(4'-hydroxyphenoxy)-4-hydroxyanthraquinone, 70 parts of acetone, 6 parts of sodium carbonate and parts of ethanesulfonyl chloride is stirred for 20 hours at temperature of 25° C., thereby to produce crystals, which are separated by filtration.

The thus-obtained novel dyestuff having the following formula,

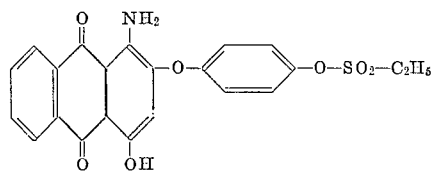

M.P. 175° to 178° C. (crude crystals)

may be employed for dyeing aromatic polyester fiber articles in red shade with high fastnesses to light and sublimation.

EXAMPLE 10

A mixture of 7 parts of 1-amino-2-(4'-hydroxyphenoxy)-4-hydroxyanthraquinone and 35 parts of pyridine is gradually added with 6.8 parts of p-ethoxybenzenesulfonyl chloride during 2 hours period of time at temperature of 20° C. and the reaction mixture is further stirred for 24 hours at the same level of temperature. Then, 40 parts of methyl alcohol is added thereto, thereby to produce crystals, which are separated by filtration.

The thus-obtained novel dyestuff having the following formula,

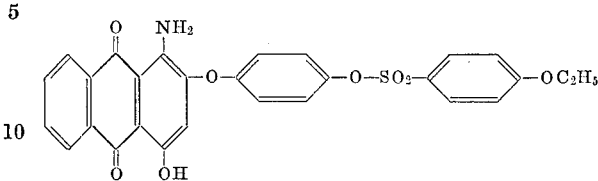

M.P. 160° to 168° C. (crude crystals)

may be employed for dyeing aromatic polyester fiber articles in red shade with high fastness to sublimation.

EXAMPLE 11

A mixture of 3.5 parts of 1-amino-2-(3'-hydroxyphenoxy)-4-hydroxyanthraquinone, 14 parts of pyridine and 3.4 parts of benzoic acid anhydride is stirred for 3 hours at a temperature of 20° to 30° C. and 5 parts of water is added thereto.

The reaction mixture is further stirred for a while, thereby to produce crystals, which are separated by filtration, washed with ethyl alcohol and dried.

Thus, a novel chromatographically pure dyestuff having the following formula,

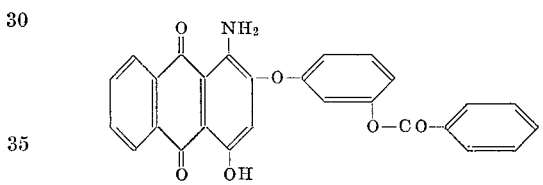

M.P. 125° to 130° C. (crude crystals)

is obtained, which may be employed for dyeing aromatic polyester fiber articles in bluish red shade with fastness to light and sublimation.

EXAMPLE 12

A mixture of 2 parts of 1-amino-2-(4'-hydroxyphenoxy)-4-hydroxyanthraquinone and 30 parts of pyridine is gradually added with 5.4 parts of benzoyl chloride at a temperature of 3° to 7° C.

With the progress of the reaction, production of crystals is observed. The produced crystals are separated by filtration, washed with ethyl alcohol and water, and dried.

The thus-obtained dyestuff having the following formula,

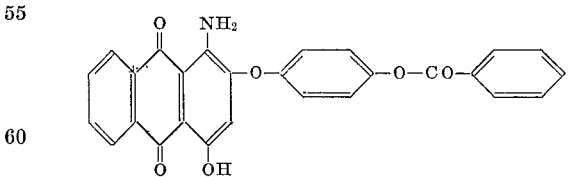

M.P. 220° to 222° C.

may be employed for dyeing aromatic polyester fiber articles in bluish red shade with fastnesses, especially fastness to sublimation.

EXAMPLE 13

A mixture of 2 parts of 1-amino-2-(4'-hydroxyphenoxy)-4-hydroxyanthraquinone, 20 parts of ethyleneglycol monomethyl ether, 2 parts of sodium carbonate and 1.2 parts of acetic acid anhydride is stirred for 5 hours at a temperature of 25° to 35° C. and the reaction mixture is treated according to the same way as in Example 12, thereby to obtain a novel dyestuff having the following formula,

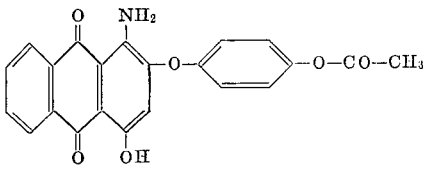

M.P. 193° to 196° C.

which may be employed for dyeing aromatic polyester fiber articles in bluish red shade with fastnesses, especially fastness to sublimation.

EXAMPLE 14

A mixture of 3.5 parts of 1-amino-2-(3'-hydroxyphenoxy)-4-hydroxyanthraquinone, 20 parts of pyridine and 2 parts of propionic acid anhydride is stirred for 5 hours at a temperature of 5° to 10° C. Completion of the reaction is confirmed by means of chromatography. After the reaction is over, the reaction mixture is added with 8 parts of water and stirred for a while, thereby to produce crystals, which are separated off by filtration, washed with methyl alcohol and dried.

The thus-obtained novel dyestuff having the following formula,

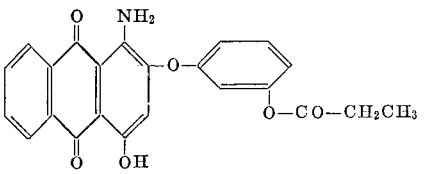

may be employed for dyeing aromatic polyester fiber articles in bluish red with fastness, especially fastness to sublimation.

EXAMPLE 15

A mixture of 3.5 parts of 1-amino-2-(3'-hydroxyphenoxy)-4-hydroxyanthraquinone, 20 parts of pyridine and 1.5 parts of acetic acid anhydride is stirred for 2 hours at a temperature of 5° to 10° C. and the reaction mixture is added with 20 parts of water, thereby to produce crystals, which are separated by filtration, washed with methyl alcohol and dried.

The thus-obtained novel dyestuff having the following formula,

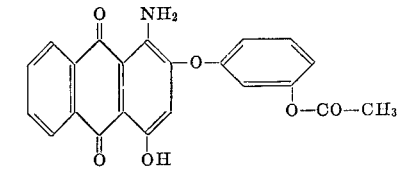

may be employed for dyeing aromatic polyester fiber articles in bluish red with fastness to sublimation.

EXAMPLE 16

A mixture of 2 parts of 1-amino-2-(4'-hydroxyphenoxy)-4-hydroxyanthraquinone and 20 parts of pyridine is gradually added with 5.4 parts of phenylacetyl chloride at a temperature of 20° to 25° C. Subsequently, the reaction mixture is heated to 40° C. stirred for 30 minutes and thereafter, treated according to the same way as in Example 11, thereby to obtain a novel dyestuff having the following formula,

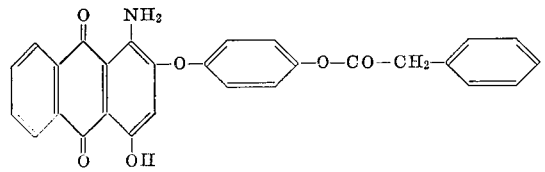

which may be employed for dyeing aromatic polyester fiber articles in bluish red shape with fastness to sublimation.

EXAMPLE 17

A mixture of 3.5 parts of 1,4-dihydroxy-2-(4'-hydroxyphenoxy)-anthraquinone and 17.5 parts of pyridine is gradually added with 5 parts of p-methylbenzenesulfonyl chloride at temperature of 30° C.

The reaction mixture is further stirred for 24 hours, thereby to produce crystals, which are separated by filtration, then washed and dried.

The thus-obtained novel dyestuff having, as a principal component, the following formula,

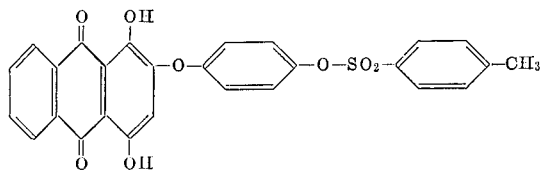

M.P. 195° to 199° C. (crude crystals)

may be employed for dyeing polyester fiber articles in orange shade with high fastnesses to light and sublimation.

EXAMPLE 18

A mixture of 4 parts of 1-amino-2-[3'-(benzenesulfophenoxy]-4-hydroxyanthraquinone obtained in Example 11, 6 parts of disodium dinaphthylmethanedisulfonate and 20 parts of water is ground on a ball mill for 48 hours. The resulting colloidal liquor is subjected to spray drying, thereby to obtain 10 parts of a dyeing agent.

Into a dye bath consisting of 1,000 parts of water and 2 parts of the dyeing agent obtained above, 25 parts of aromatic polyester spun yarn is dipped, and the dyeing bath is gradually heated. The temperature is kept at 130° C. under pressure for 60 minutes.

Thereafter, the resulting yarn is washed with hot water, further washed reductively, rinsed and dried, thereby to obtain a dyed product in clear deep bluish red shade.

The thus-obtained dyed product is excellent in fastnesses, especially fastnesses to light and sublimation.

EXAMPLE 19

A mixture of 4 parts of 1-amino-2-[3'-(benzenesulfonyloxy)phenoxy]-4-hydroxyanthraquinone, 6 parts of disodium dinaphthanedisulfonate and 20 parts of water is treated according to the same way as in Example 18, thereby to obtain 10 parts of a dyeing agent.

Twenty parts of aromatic polyester spun yarn is treated in a dye bath prepared by mixing 1 part of the dyeing agent obtained above the 1,000 parts of water, 4 parts of o-phenylphenol and 2 parts of acetic acid, at temperature of 100° C. for 90 minutes. The resulting yarn is washed with hot water, further washed reductively, rinsed and dried, thereby to obtain a dyed product in clear bluish red shade.

The thus-obtained dyed product is excellent in fastness, especially fastness to sublimation.

EXAMPLE 20

A mixture of 4 parts of 1-amino-2-[4'-(p-methylbenzenesulfonyloxy)phenoxy] - 4-hydroxyanthraquinone obtained in Example 6, 6 parts of disodium dinaphthylmethane disulfonate and 20 parts of water is treated according to the same way as in Example 18, thereby to obtain 10 parts of a dyeing agent. Aromatic polyester cloth is printed with a paste prepared by mixing 5 parts of the dyeing agent obtained above with 30 parts of water and 65 parts of starch tragacanth. After the printed material is dried, it is heat-treated on an expander at temperature of 200° C. for 2 minutes, washed with water and further washed reductively, thereby to obtain a dyed product in deep bluish red shade with fastnesses.

According to the same way as in Examples 18 to 20, aromatic polyester fiber articles are dyed in various shades as shown in the following table with fastnesses, using the present anthraquinone disperse dyestuffs, the formulae of which are also shown in the same table.

TABLE

| Example Number: | Formula of the dye | Shade |
|---|---|---|
| 21 | anthraquinone with NH$_2$, OH, and —O—C$_6$H$_4$—OSO$_2$—C$_6$H$_4$—OC$_2$H$_5$ substituent | Bluish red. |
| 22 | anthraquinone with NH$_2$, NH$_2$, and —O—C$_6$H$_4$—OSO$_2$—C$_6$H$_4$—OCH$_3$ substituent | Violet. |
| 23 | anthraquinone with OH, OH, and —O—C$_6$H$_4$(O—SO$_2$—C$_6$H$_5$) substituent | Orange. |
| 24 | anthraquinone with OH, OH, and —O—C$_6$H$_4$—OSO$_2$—C$_6$H$_4$—Cl substituent | Do. |
| 25 | anthraquinone with Cl, NH$_2$, OH, and —O—C$_6$H$_4$—OSO$_2$—C$_6$H$_4$—C$_3$H$_7$(iso) substituent | Bluish red. |
| 26 | anthraquinone with NH$_2$, OH, Br, and —O—C$_6$H$_4$(O—SO$_2$—C$_6$H$_5$) substituent | Do. |
| 27 | anthraquinone with Cl, Cl, NH$_2$, OH, and —O—C$_6$H$_4$—O—SO$_2$C$_2$H$_4$OCH$_3$ substituent | Do. |
| 28 | anthraquinone with NH$_2$, OH, and —O—C$_6$H$_4$—OSO$_2$—C$_6$H$_3$(Cl)(Cl) substituent | Do. |
| 29 | anthraquinone with NH$_2$, OH, and —O—C$_6$H$_3$(CH$_3$)(O—SO$_2$—C$_6$H$_5$) substituent | Do. |

TABLE—Continued

| Example Number | Formula of the dye | Shade |
|---|---|---|
| 30 | 1-amino-2-(2-hydroxyphenoxy-sulfonylphenyl)-4-hydroxyanthraquinone derivative | Bluish red. |
| 31 | 1-amino-2-(chloro-phenoxy-phenylsulfonyl)-4-hydroxyanthraquinone derivative | Do. |
| 32 | 1,4-diamino-2-(phenoxy-phenylsulfonyl-phenoxy-C₄H₉(n))-3-chloroanthraquinone derivative | Violet. |
| 33 | 1-amino-2-(methoxy-phenoxy-sulfonyl-tolyl)-4-hydroxyanthraquinone derivative | Bluish red. |
| 34 | 1-amino-2-(phenoxy-phenylsulfonyl)-3-chloro-4-hydroxyanthraquinone derivative | Do. |
| 35 | 1-amino-2-(di(ethylsulfonyl)phenoxy)-4-hydroxyanthraquinone derivative | Do. |
| 36 | 1-amino-2-(phenoxy-phenylsulfonyl-cyclohexyl)-6-chloro-4-hydroxyanthraquinone derivative | Do. |
| 37 | 1-amino-2-(phenoxy-phenyl-O-SO₂CH₂Cl)-4-hydroxyanthraquinone derivative | Do. |
| 38 | 1-amino-2-(phenoxy-phenyl-OSO₂CH=CH₂)-4-hydroxyanthraquinone derivative | Do. |
| 39 | 1-amino-2-(phenoxy-phenyl-OCOC₄H₉(n))-4-hydroxyanthraquinone derivative | Do. |

TABLE—Continued

| Example Number | Formula of the dye | Shade |
|---|---|---|
| 40 | 1-amino-2-(phenoxy with OCOCH$_3$)-4-hydroxyanthraquinone | Bluish red. |
| 41 | 8-chloro-1-amino-2-(4-OCOCH=CH$_2$-phenoxy)-4-hydroxyanthraquinone | Do. |
| 42 | 5-bromo-1-amino-2-(4-OCOCH$_2$CH$_2$OCH$_3$-phenoxy)-4-hydroxyanthraquinone | Do. |
| 43 | 1-amino-2-(4-OCOCH$_2$CH$_2$OH-phenoxy)-4-aminoanthraquinone | Violet. |
| 44 | 6,7-dichloro-1-amino-2-(4-OCOCH$_2$Cl-phenoxy)-4-hydroxyanthraquinone | Bluish red. |
| 45 | 1-amino-2-(chloro-OCOCH$_2$-O-phenyl-phenoxy)-4-hydroxyanthraquinone | Do. |
| 46 | 1-amino-2-(OCOCH$_2$Cl, CH$_3$-phenoxy)-4-hydroxyanthraquinone | Do. |
| 47 | 1-amino-2-(4-OCO-C$_6$H$_4$-CH$_3$-phenoxy)-4-hydroxyanthraquinone | Do. |
| 48 | 1-amino-2-(4-OCO-C$_6$H$_4$-C$_3$H$_7$(n)-phenoxy)-4-hydroxyanthraquinone | Do. |
| 49 | 1-amino-2-(4-OCO-C$_6$H$_4$-OC$_2$H$_5$-phenoxy)-4-hydroxyanthraquinone | Do. |

TABLE—Continued

| Example Number: | Formula of the dye | Shade |
|---|---|---|
| 50 | [anthraquinone with O, NH₂, O-phenyl-OCO-phenyl-Cl, OH] | Bluish red. |
| 51 | [anthraquinone with O, NH₂, O-phenyl-OCOCH₃, OH] | Violet. |
| 52 | [anthraquinone with O, OH, O-phenyl-OCOCH₃, OH] | Orange. |
| 53 | [dichloro-anthraquinone with OH, O-phenyl-OCOCH₃, OH] | Do. |
| 54 | [anthraquinone with O, NH₂, O-phenyl(OCOCH₃)₂, OH] | Bluish red. |
| 55 | [anthraquinone with O, NH₂, O-phenyl-OCO-C₆H₁₁, Cl, NH₂] | Violet. |
| 56 | [dichloro-anthraquinone with OH, O-phenyl-OCO-phenyl, OH] | Orange. |

What we claim is:

1. A novel anthraquinone disperse dyestuff represented by the following formula,

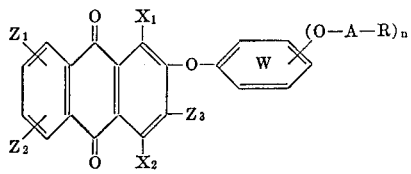

wherein A means a bridging radical represented by a formula of —SO₂—, or —CO—, R means an alkyl radical or alkenyl radical having 1 to 6 carbon atoms; an alkoxyalkyl radical having 3 to 6 carbon atoms; a haloalkyl radical or a haloalkenyl radical having 1 to 3 carbon atoms; an aralkyl radical having 7 to 10 carbon atoms; a cycloalkyl radical having 5 to 7 carbon atoms; phenyl radical substituted or not substituted with an alkyl radical, and alkoxy radical or alkylmercapto radical having 1 to 6 carbon atoms, a hydroxy radical or a halogen atom; $X_1$ and $X_2$ each mean amino radical or hydroxy radical, $Z_1$, $Z_2$ and $Z_3$ mean respectively hydrogen atom or a halogen atom, n means a whole number of 1 or 2, and benzene nucleus W may be further substituted with a lower alkyl radical, a lower alkoxy radical or a halogen atom.

2. A dyestuff according to claim 1 wherein R means an alkyl radical of 1 to 6 carbon atoms.

3. A dyestuff according to claim 1 wherein R means an alkenyl radical having 1 to 6 carbon atoms.

4. A dyestuff according to claim 1 wherein R means an alkoxyalkyl radical having 3 to 6 carbon atoms.

5. A dyestuff according to claim 1 wherein R means a phenyl radical.

6. A dyestuff according to claim 1 wherein R means a phenyl radical substituted with an alkyl radical.

7. A novel anthraquinone disperse dyestuff represented by the formula,

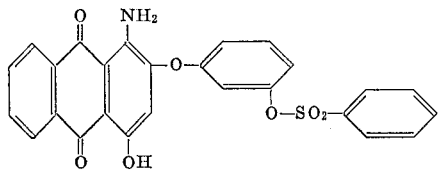

References Cited

UNITED STATES PATENTS

| | | | |
|---|---|---|---|
| 2,213,188 | 9/1940 | Fleischhaur | 260—374 |
| 2,773,071 | 12/1956 | Pizzarello | 260—380 |

FOREIGN PATENTS

| | | | |
|---|---|---|---|
| 998,858 | 7/1965 | Great Britain | 260—376 |

LORRAINE A. WEINBERGER, Primary Examiner

R. GERSTL, Assistant Examiner

U.S. Cl. X.R.

8—39, 40; 260—376, 380, 381, 383